US009811963B2

(12) United States Patent
Hough et al.

(10) Patent No.: US 9,811,963 B2
(45) Date of Patent: Nov. 7, 2017

(54) CONVEYING MONEY ITEMS (71) Applicant: Crane Payment Solutions Limited, Lancashire (GB)

(72) Inventors: Stephen L. Hough, Lancashire (GB); Michael J. Rigby, Lancashire (GB); Robert James Blythin, Manchester (GB)

(73) Assignee: Crane Payment Innovations Ltd., Lancashire (GB)

( * ) Notice: Subject to any disclaimer, the term of this patent is extended or adjusted under 35 U.S.C. 154(b) by 0 days.

(21) Appl. No.: 15/326,640

(22) PCT Filed: Jun. 29, 2015

(86) PCT No.: PCT/GB2015/051884
§ 371 (c)(1),
(2) Date: Jan. 16, 2017

(87) PCT Pub. No.: WO2016/009170
PCT Pub. Date: Jan. 21, 2016

(65) Prior Publication Data
US 2017/0213408 A1    Jul. 27, 2017

(30) Foreign Application Priority Data
Jul. 16, 2014  (GB) .................................. 1412624.7

(51) Int. Cl.
*G07D 1/00*  (2006.01)
*G07D 9/04*  (2006.01)
(Continued)

(52) U.S. Cl.
CPC ................. *G07D 1/00* (2013.01); *G07D 9/04* (2013.01); *B65G 15/00* (2013.01); *B65G 17/06* (2013.01)

(58) Field of Classification Search
CPC ........ B65G 15/00; B65G 15/06; B65G 17/06; B65G 17/067; B65G 17/068; G07D 1/00; G07D 3/00
See application file for complete search history.

(56) References Cited

U.S. PATENT DOCUMENTS

| 4,535,794 A | * | 8/1985 | Bellis ................. B65G 47/1471 221/253 |
| 8,226,458 B2 | * | 7/2012 | Aguado Vitas .......... G07D 1/00 221/253 |
| 2003/0032387 A1 | * | 2/2003 | Abe ....................... G07D 9/008 453/56 |

FOREIGN PATENT DOCUMENTS

| EP | 0080842 A2 | 6/1983 |
| EP | 2226769 A1 | 9/2010 |

(Continued)

OTHER PUBLICATIONS

Notification of International Search Report and Written Opinion of the International Searching Authority dated Sep. 15, 2015 in connection with International Application No. PCT/GB2015/051884, 10 pages.

(Continued)

*Primary Examiner* — Mark Beauchaine (57) ABSTRACT

A money item conveyor comprising a plurality of money item conveying members configured to convey money items around a looped path, wherein the plurality of conveying members each comprise first and second money item support surfaces configured to simultaneously support a main face of a money item on the conveying member, the support faces being separated by an articulation region to allow relative movement of the support surfaces.

20 Claims, 4 Drawing Sheets

(51) Int. Cl.
   *B65G 17/06* (2006.01)
   *B65G 15/00* (2006.01)

(56) References Cited

FOREIGN PATENT DOCUMENTS

| GB | 2513539 A | 5/2014 |
|----|-----------|--------|
| WO | 2009030651 A2 | 3/2009 |
| WO | 2011158205 A1 | 12/2011 |

OTHER PUBLICATIONS

Search Report dated Jan. 20, 2015 in connection with British Application No. 1412624.7, 3 pages.

\* cited by examiner

CONVEYING MONEY ITEMS

CROSS-REFERENCE TO RELATED APPLICATION(S)

The present application claims priority under 35 U.S.C. §365 to International Patent Application No. PCT/GB2015/051884 filed Jun. 29, 2015, entitled "CONVEYING MONEY ITEMS", and through International Patent Application No. PCT/GB2015/051884, to British Patent Application No. 1412624.7, filed Jul. 16, 2014, each of which are incorporated herein by reference into the present disclosure as if fully set forth herein.

FIELD

This specification relates to conveying money items.

BACKGROUND

Conveying money items such as coins around a money item handling system can present challenges, particularly in relation to undesirable jamming and money item singulating problems.

SUMMARY

This specification describes an embodiment of a money item conveyor comprising a plurality of money item conveying members configured to convey money items around a looped path, the plurality of conveying members each comprising first and second money item support surfaces configured to simultaneously support a main face of a money item on the conveying member, the support faces being separated by an articulation region to allow relative movement of the support surfaces, wherein the second support surface comprises two parts which are non coplanar.

The two parts of the second support surface may be parallel.

A lower of the two parts of the second support surface may be further from the articulation region than a higher of the two parts.

The first support surface may be coplanar with the higher of the two parts of the second support surface when the higher of the two parts of the second support surface is parallel with the first support surface.

A line of separation between the two parts of the second support surface may extend across the surface in a direction which is substantially perpendicular to the direction of movement of the conveyor.

The two parts of the second support surface may be separated by a step.

The first and second money item support surfaces of each money item conveying member may be provided on first and second sections of the money item conveying member, which may have a length which is equal to or less than 40 mm, for example equal to or less than 35 mm.

The first and second sections of each money item conveying member may have a length which is equal to or less than 33 mm.

The length of the first and second sections may be approximately parallel to the direction of movement of the conveyor.

A width of the first and second sections of each money item conveying member may be equal to or less than 33 mm, for example equal to or less than 31 mm.

The conveying members may each comprise a money item boundary surface which is upstanding from the second support surface.

The conveying members may each comprise a money item conveying surface which is upstanding from the first support surface.

The articulation region of each money item conveying member may comprise an articulation line which extends across the conveying member in a direction which is substantially perpendicular to the direction of movement of the conveyor.

The articulation region of each money item conveying member may comprise a hinge.

The plurality of conveying members may be connected together by further articulation regions.

The further articulation regions may each comprise a hinge.

This specification also provides a money item handling apparatus comprising the money item conveyor.

The money item handling apparatus may comprise a money item hopper configured to feed money items onto the conveying members of the conveyor.

This specification also provides an embodiment of a money item dispensing system comprising the money item conveyor and/or the money item handling apparatus.

The money item dispensing system may comprise an additional money item conveyor, which may comprise an endless loop conveyor, and the money item handling apparatus may be located within the internal region of the additional conveyor.

BRIEF DESCRIPTION OF THE FIGURES

For the purposes of example only, embodiments are described below with reference to the accompanying figures in which.

DETAILED DESCRIPTION

Figure 1:
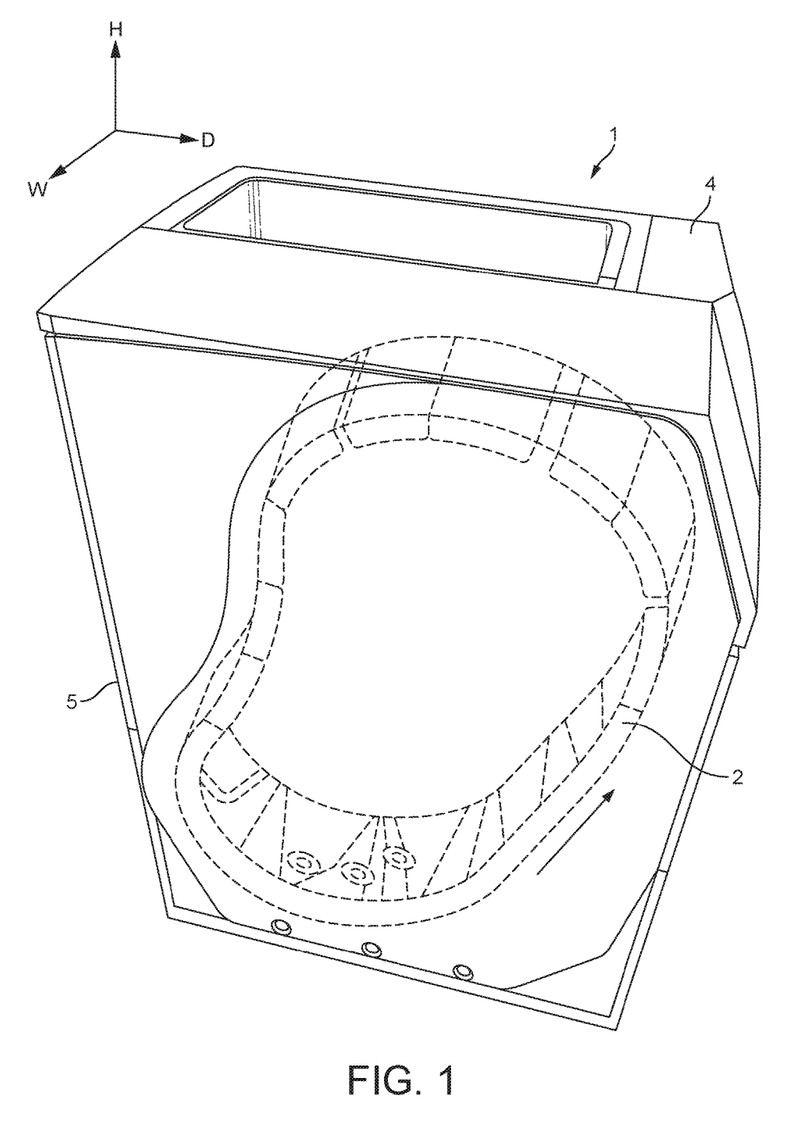
FIG. 1 is an illustration of a money item handling system comprising a money item hopper and a money item conveyor.

A money item handling system 1 comprising a money item conveyor 2 is illustrated in FIG. 1. As explained below, the money item handing system 1 has a relatively small size which allows it to be used in small space envelopes. The conveyor 2 is an endless loop conveyor 2 configured to operate within the small size of the money item handling system 1. As explained below, the conveyor 2 is configured to solve problems that can be caused when attempting to convey money items around a small loop.

As explained below in relation to FIGS. 2 and 3, the money item handling system 1 may be located inside a larger money item dispensing system 3 and comprises a money item storage unit, such as a money item hopper 4, which is configured to feed money items onto the conveyor 2. The conveyor 2 is configured to accommodate money items received from the hopper 4 and to individually convey the money items to an exit of the conveyor 2. At the exit, the money items may leave the conveyor 2 and be directed into another part of the dispensing system 3, such as a payout region, another money item hopper or a cash box.

As illustrated in FIG. 1, the money item handling system 1 comprises a housing 5 in which the money item hopper 4 and the money item conveyor 1 are located. The housing 5 may have a height H which is equal to or less than approximately 250 mm, such as approximately 210 mm. The depth D of the housing 5 may be equal to or less than approximately 155 mm. The width W of the housing 5 may be equal to or less than approximately 107 mm, such as 106.5 mm or 105 mm. One example of the housing 5 has a maximum height H of 210 mm, a maximum depth D of 155 mm and a maximum width W of 105 mm. Another example of the housing 5 has a maximum height H of 250 mm, a maximum depth D of 155 mm and a maximum width W of 106.5 mm.

The small size of the money item handling system 1 means that the system 1 can be included in a money item dispensing system 3 with another money item conveyor provided around the outside of it. The size of the handling system 1 is such that the additional conveyor can be included whilst still accommodating the entire money item dispensing system 3 within the standard industry size envelope for such dispensing systems. This type of arrangement provides an efficient use of space in a money item dispensing system 3 and may also increase the money item conveying and dispensing capacity of the dispensing system 3 as a whole.

Figure 2:
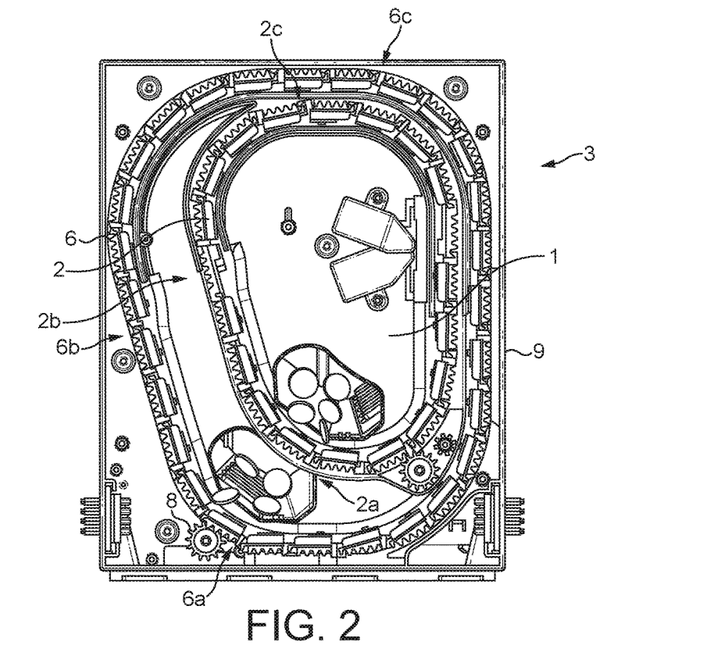
FIG. 2 is a schematic illustration of a money item dispensing system comprising two endless loop conveyors of different lengths, one being located inside the other.
Figure 3:
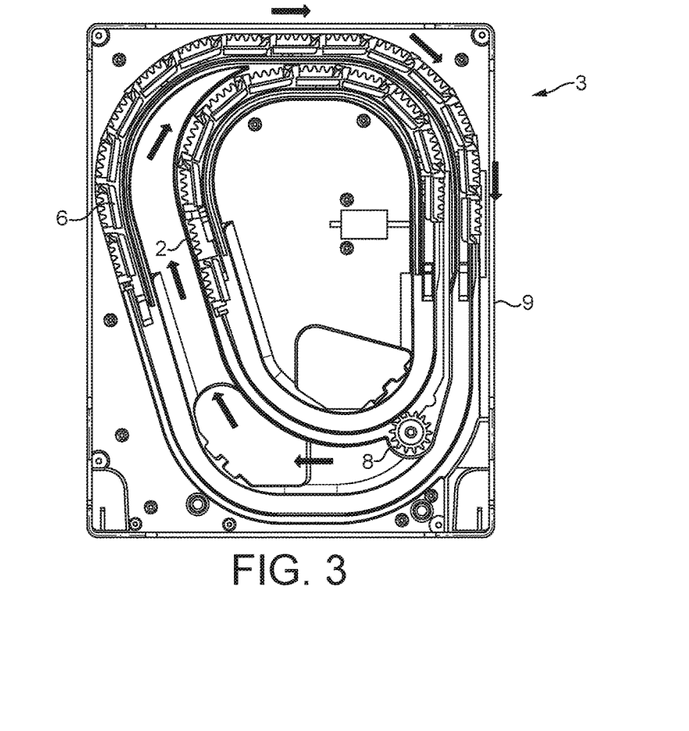
FIG. 3 is another schematic illustration of two endless loop conveyors in a money item dispensing system.

An example of a money item dispensing system 3 comprising the money item handling system 1 and an additional endless loop conveyor 6 is schematically illustrated in FIGS. 2 and 3. The additional endless loop conveyor 6 is located around the outside of the money item handling system 1 and is referred to below as the outer conveyor 6. The conveyor 2 of the money item handling system 1 is referred to as the inner conveyor 2.

In a similar manner to the inner conveyor 2, the outer conveyor 6 may be configured to receive money items from a money item storage unit, such as a dedicated money item hopper. The use of multiple dedicated hoppers allows the dispensing system 3 to dispense different types of money item faster than would be the case with a single conveyor, single hopper system. This is because different types of money item can be split between the hoppers and thus dispensed immediately onto the associated conveyor 2, 6 without the need to wait for the money items to be discriminated in a discriminator attached to the hopper. Alternatively, if the hoppers contain the same type of money item, the money items can be dispensed at approximately double the speed than that which would be possible with a single conveyor, single hopper system.

As shown schematically in FIG. 3, both conveyors 2, 6 are configured to convey money items received on the conveyors 2, 6 to exit regions. Movement of the conveyors 2, 6 may be caused by engagement with one or more controllable drive units 8, which cause the conveyors 2, 6 to rotate around their looped paths. For example, as schematically illustrated in FIGS. 2 and 3, teeth on the outwardly facing, circumferential surface of each conveyor 2, 6 may engage with a drive wheel located at the outside of the conveyor 2, 6 so that movement of the drive wheel causes corresponding movement of the conveyor 2, 6. In the case of the inner conveyor 2, the drive unit 8 may be comprised within the housing 5 of the money item handling system 1.

As indicated schematically in FIGS. 2 and 3, the money item handling system 1 is located entirely within the internal region of the outer conveyor 6 so that the looped path of both the inner and the outer conveyors 2, 6 can be aligned in the same plane. The alignment of the inner conveyor 2 in the plane of the outer conveyor 6 increases the money item conveying capacity and flexibility of the dispensing system 3, without occupying any more volume than would be occupied by the outer conveyor 6 alone. As such, the dispensing system 3 is able to conform to the standard size envelope used by industry whilst also offering extra conveying capacity.

The money item handling system 1 and the outer conveyor 6 are located inside a housing 9 of the dispensing system 3, along with other elements of the dispensing system 3. The height of the housing 9 is less than or equal to 284.5 mm+/−1.0 mm and therefore has a maximum height of 285.5 mm. This ensures that the height of the housing 9, and all of the elements of the dispensing system 3 within it, including the conveyors 2, 6, is such that the dispensing system 3 fits within the standard size envelope required by the industry.

As schematically illustrated in FIG. 2, money items are fed onto the conveyors 2, 6 in receiving regions 2a, 6a close the bottoms of the looped conveyor paths. In addition to the money item receiving region 2a, 6a, the path of each conveyor 2, 6 may also comprise an escalating region 2b, 6b. As shown by the conveyance direction arrows in FIG. 3, the escalating region 2b, 6b immediately follows the receiving region 2a, 6a and comprises an upwardly extending section of the conveyor path in which money items are lifted in an approximately vertical orientation. The path of the outer and/or the inner conveyor 2, 6 may also comprise a bridge region 2c, 6c, into which money items may be lifted by the escalating regions 2b, 6b. As shown schematically in FIG. 2, the receiving regions 2a, 6a of the conveyor paths may be located at a point where the conveyors 2, 6 begin to bend upwards from a substantially horizontal region at the bottom of the conveyor path into the escalating regions 2b, 6b.

Although the escalating regions 2b, 6b may be described as approximately vertical, it will be appreciated that the principal function of the escalating regions 2b, 6b is to convey money items upwards, for example into the bridge regions 2c, 6c, and that it is not necessary for the escalating regions 2b, 6b to be truly vertical for this to be achieved. For example, the conveying direction of the escalating region 2b, 6b may be off vertical by approximately 10° to 15°, or more, so that the main faces of the money items lean against the inwardly facing surfaces of the conveyors 2, 6 as the money items are conveyed upwards.

The bridge regions 2c, 6c immediately follow the escalating regions 2b, 6b and each comprise an approximately horizontal section of the conveyor path in which characteristics of the money items may be sensed as the money items are conveyed. In this region 2c, 6c of the conveyor path, the money items are located beneath the conveyors 2, 6 and are supported against gravity by a static bridge. The exits of one or both of the conveyors 2, 6 may be located beyond the bridge region 2c, 6c so that money items on the conveyor(s) 2, 6 exit the conveyor(s) 2, 6 in a descending region of the conveyor path(s).

In alternative configurations, the exits of one or both of the money item conveyors 2, 6 may be located in the escalating region 2b, 6b of the conveyor path(s). For example, the exit of either the outer or the inner conveyor 2, 6 (or both) may be located in the escalating region 2b, 6b of the conveyor path. In general, the exit of the inner conveyor 2 may be provided in the escalating region 2b of the conveyor path even in situations where the outer conveyor 6 is not present.

The money item handling system 1, and particularly its money item conveyor 2, are described below with reference to the features which optimise operation of the conveyor 2 in the small space envelope referred to above.

Figure 4:
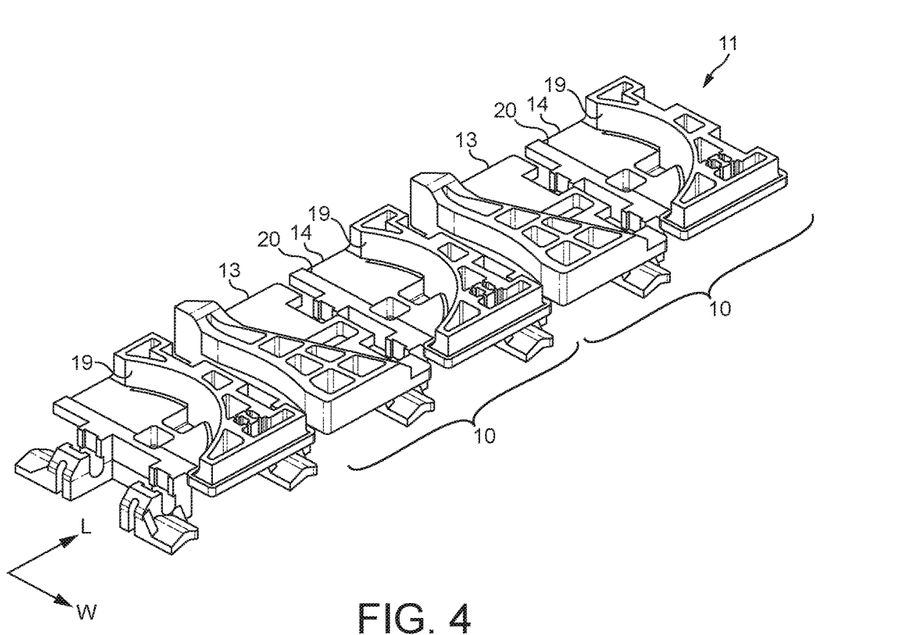
FIG. 4 is a perspective illustration of a money item conveying side of a section of a money item conveying track.
Figure 5:
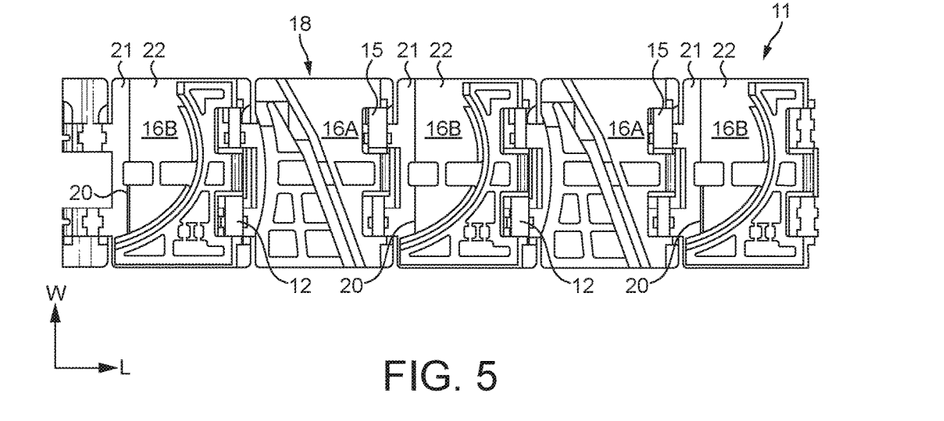
FIG. 5 is a plan view of a money item conveying side of a section of a money item conveying track.
Figure 6:
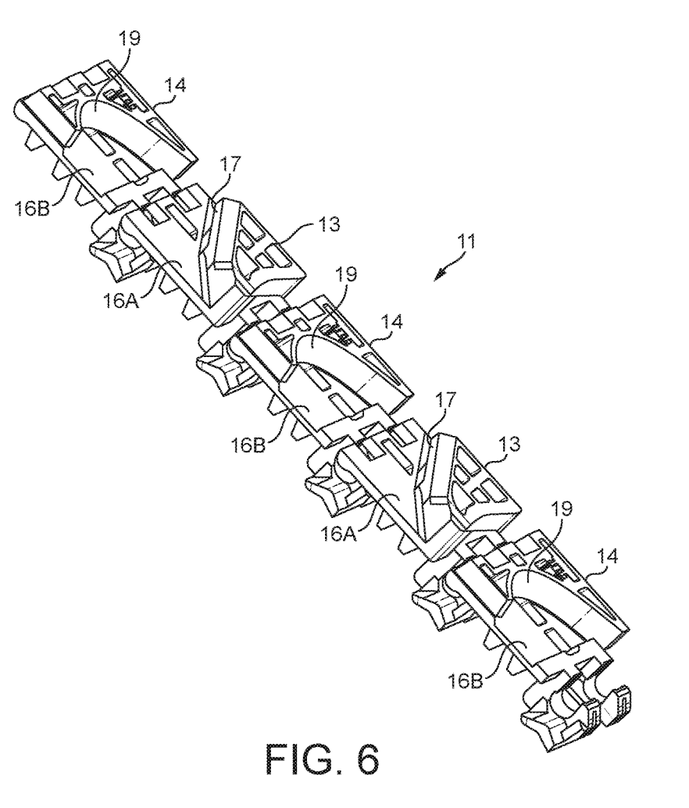
FIG. 6 is another perspective illustration of a money item conveying side of a section of a money item conveying track.

Referring to FIGS. 4 to 6, the conveyor 2 of the money item handling system 1 comprises a plurality of connected money item conveying members 10 on which money items are conveyed. The connected conveying members 10 form a conveying track 11. Each of the plurality of conveying members 10 is articulated to its neighbouring members 10 by hinges or otherwise flexible joints 12 to form the endless loop shown in FIGS. 1 to 3. The articulation between the conveying members 10 allows the individual members 10 to move relative to one another and hence around bends in the looped path of the conveyor 2.

Each conveying member 10 of the conveying track 11 comprises first and second money item support sections 13, 14, which together support a single money item as it is conveyed around the path of the conveyor 2. In a similar manner to the connections between the conveying members 10, the first and second support sections 13, 14 of each conveying member 10 are articulated to one another. For example, as best shown in FIG. 5, each conveying member 10 may comprise a hinge 15 between the first and second support sections 13, 14. The hinge 15 extends in a direction which is approximately perpendicular to the direction of movement of the conveying track 11. The articulation of the first and second support sections 13, 14 improves the ability of the conveying track 11 to pass smoothly around the relatively tight bends in the unusually small loop of the conveyor 2 of the money item handling apparatus 1.

The ability of the conveying track 11 to pass smoothly around the bends of the looped conveyor 2 is further enhanced by the small size of the conveying members 10. For example, each of the first and second sections 13, 14 of the conveying members 10 in the conveying track 11 may have a length L which is equal to or less than approximately 40 mm, such as equal to or less than 35 mm or 33 mm, and a width W which is equal to or less than approximately 33 mm. An example is a conveying track 11 in which the first and second sections 13, 14 of the articulated conveying members 10 each have a length L of approximately 32.6 mm and a width W of approximately 31 mm. The lengths of the first and second sections 13, 14 of the conveying members 10 may be about half those of the elements of previously known conveying tracks.

As shown in FIGS. 4 to 6, the first and second sections 13, 14 of each conveying member 10 each comprise a money item support surface 16A, 16B. The money item support surfaces 16A, 16B are configured to simultaneously support the main face of a single money item during conveyance, so that the main face of the money item lies simultaneously against both of the money item support surfaces 16A, 16B and overlaps the hinge 15. The money item support surfaces 16A, 16B are divided from one another by the articulation between the first and second sections 13, 14 of the conveying members 10, so that the angle between the support surfaces 16A, 16B changes as the conveying members 10 move around the path of the conveyor 2.

In addition to the money item support surfaces 16A, 16B, each conveying member 10 comprises a money item conveying surface 17 which is configured to exert a driving force against an edge of a money item on the conveying member 10. The driving force exerted by the conveying surface 17 is caused by movement of the conveying track 11 and is responsible for moving the money item around the looped path of the conveyor 2. As shown in FIGS. 4 and 6, the conveying surface 17 is upstanding from the support surface 16A of the first section 13 of the conveying member 10. The conveying surface 17 and the support surface 16A of the first section 13 of the conveying member 10 may, for example, be approximately perpendicular to one another. The support surfaces 16A, 16B are located forwards of the conveying surface 17 so that, during movement of the conveying track 11, the edge of a money item on the conveying member 10 naturally locates against the conveying surface 17. The abutment between the conveying surface 17 and the edge of the money item causes the money item to be urged forwards in the direction of movement of the conveying track 11.

The conveying surface 17 extends across the conveying member 10 at an angle which is non-perpendicular to the direction of movement of the conveying track 11. This causes money items abutting the conveying surface 17 to move along the conveying surface 17 towards the point at which the conveying surface 17 makes an acute angle with the longitudinal edge 18 of the conveying member 10. Adjacent to this longitudinal edge 18 is a static guide surface of the money item handling system 1. The static guide surface runs parallel to the path of the longitudinal edge 18 of the conveying track 11 so that money items on the conveying members 10 are supported, and retained on the conveyor 2, by a combination of the conveying surface 17 and the static guide surface as they are conveyed around the path of the conveyor 2.

The height of the conveying surface 17 above the support surface 16A of the first section 13 of the conveying member 10 may be chosen so as to ensure that the surface 17 reliably abuts and conveys money items forward without also abutting and conveying the edges of one or more surplus money items. For example, the height of the conveying surface 17 may be chosen so as to be high enough to abut the thin edge of a money item resting against the support surfaces 16A, 16B, but not high enough to also abut and convey a surplus money item that might be lying face to face with the first money item. The height of the conveying surface 17 may, for example, be equal to or less than the thickness of the thinnest money item to be conveyed. An example is height is less than approximately 1.2 mm, such as less than approximately 1 mm. The lack of abutment with the conveying surface 17 may cause such surplus money items to slide over the top of the conveying surface 17 and subsequently off the conveyor 2.

Referring again to FIGS. 4 to 6, each money item conveying member 10 of the conveying track 11 may also comprise a boundary surface, which is referred to below in the context of a singulating surface 19, which prevents two or more money items from being accommodated edge to edge on the support surfaces 16A, 16B referred to above. The singulating surface 19 is located at the opposite end of the conveying member 10 to the conveying surface 17 and is upstanding from the support surface 16B of the second section 14 of the conveying member 10. The singulating surface 19 and the support surface 16B of the second section 14 of the conveying member 10 may, for example, be approximately perpendicular to one another. As shown in FIGS. 4 to 6, the singulating surface 19 may be curved so as to approximately match the curve of a circular money item on the support surfaces 16A, 16B.

The distance between the conveying surface 17 and the singulating surface 19 should be chosen in dependence of the diameter of the money items which are to be conveyed on the conveying track 11. For example, the distance between these two surfaces 17, 19 should be at least as large as the diameter of the money items that are intended to be conveyed.

Referring to FIGS. 4 to 7, the support surface 16B of the second section 14 of each conveying member 10 comprises a line of separation, such as a step 20, which divides the support surface 16B into two parts 21, 22. As shown in FIG. 5, the step 20 extends across the width W of the support surface 16B in a direction which is substantially perpendicular to the direction of movement of the conveying track 11. The two parts 21, 22 of the support surface 16B may be parallel with one another but are not coplanar. In particular, the part 22 of the surface 16B which is furthest from the money item conveying surface 17, and closest to the money item singulating surface 19, at the front end of the conveying member 10, is lower than the part 21 of the surface 16B which is closer to the money item conveying surface 17 and the hinge 15 between the two sections 13, 14 of the conveying member 10. The part 22 of the conveying surface 16B between the step 20 and the singulating surface 19 at the front of the conveying member 10 therefore forms a recess. The depth of the recess below the height of the part 21 of the conveying surface 16B which is closest to the hinge 15 may, for example, be between approximately 0.5 mm and 5 mm.

Figure 7:
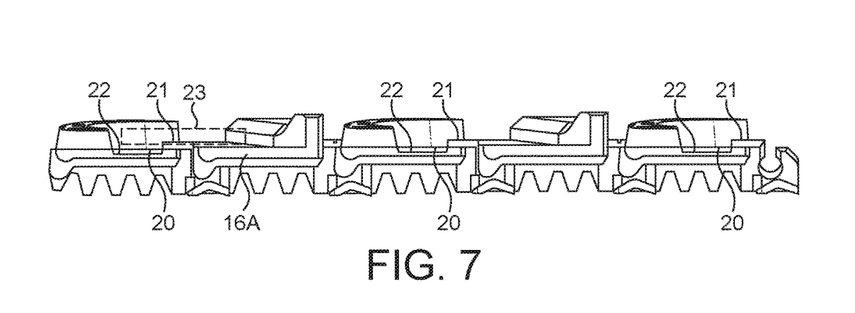
FIG. 7 is a side-on view of a section of a money item conveying track.

As shown in FIG. 7, when the support surfaces 16A, 16B of the first and second sections 13, 14 of the conveying members 10 are parallel to one another, the support surface 16A of the first section 13 of the member 10 is substantially coplanar with the first part 21 of the support surface 16B of the second section 14 of the member 10. Conversely, the support surface 16A of the first section 13 of the member 10 is not coplanar with the second part 22 of the support surface 16B of the second section 14 of the member 10. This is due to the recessed nature of the second part 22 of the support surface 16B of the second section 14.

The non coplanar nature of the support surfaces 16A, 16B reduces the likelihood of a money item on a conveying member 10 becoming jammed between the conveying surface 17 and the singulating surface 19 as the first and second sections 13, 14 of the money item conveying member 10 articulate. This is because the recessed nature of the second part 22 of the support surface 16B of the second section 14 of the conveying member 10 reduces the likelihood of the money item being squeezed between the conveying surface 17 and the singulating surface 19 as the two sections 13, 14 of the conveying member 10 articulate towards each other. As will be appreciated from the schematic illustration of FIG. 2, this can occur particularly in the transition from the money item receiving region 2a, at the bottom of the looped conveyor path, to the money item escalating region 2b. In this transition, the first and second sections 13, 14 of the conveying members 10 hinge towards each other in a manner which causes the planes of the support surfaces 16A, 16B to become significantly non parallel to one another. In this situation, the plane of a money item on the conveying member 10 may become significantly non parallel to the planes of both of the first and second sections 13, 14 of the conveying member 10 due to the front of the money item being lifted by the support face 16B of the second section 14 of the member 10 as the second section 14 of the member 10 begins to ascend the escalating region 2b. The recessed nature of the second part 22 of the support face 16B of the second section 14 reduces the likelihood of the conveying and singulating surfaces 17, 19 squeezing the money items as these actions take place.

The side edge of a coin 23 is shown in dotted outline in FIG. 7 sitting on the support face 16A and the first part 21, and it can be seen that the recessed nature of the second part 22 of the support face 16B allows a greater amount of hinging of the first and second sections than could otherwise occur, allowing the conveyor 2, 6 to traverse bends of smaller radii of curvature than would otherwise be possible, and thereby permitting the conveyor to operate within the small size of the money handling system 1.

The recessed nature of the second parts 22 of the support faces 16B of the second sections 14 of the conveying members 10 also helps to stabilize money items on the conveying members 10 as the two sections 13, 14 of the conveying members 10 articulate towards each other. The recess therefore improves the pick-up rate of the conveyor 2 by reducing the likelihood of money items being dislodged from the conveying members 10 as the two sections 13, 14 of the members 10 hinge towards each other.

The money item handling system 1 is configured to convey money items such as coins or other approximately circular tokens. The money items may be substantially circular, as in the case of coins, and may be metallic.

It will be understood that the features described above can be used either singly or in combination. For example, it will be appreciated that although the money item handling system 1 has been described above in the context of money item dispensing system 3 comprising two money item conveyors 2, 6, it is not necessary for the money item handling system 1 to be used in combination with another conveyor.

An example of a system in which the components described above may be provided is an automated payment system, such as those used in retail locations for self check-outs. Other examples are vending machines and gaming machines.

The invention claimed is:

1. A money item conveyor comprising:
a plurality of money item conveying members configured to convey money items around a looped path, each of the plurality of money item conveying members comprising first and second money item support surfaces configured to simultaneously support a main face of a money item on a conveying member, the first and second money item support surfaces being separated by an articulation region to allow relative movement of the first and second money item support surfaces, wherein the second support surface comprises two parts that are non-coplanar.

2. The money item conveyor according to claim 1, wherein the two parts of the second support surface are parallel.

3. The money item conveyor according to claim 1, wherein a line of separation between the two parts of the second support surface extends across the surface in a direction that is substantially perpendicular to a direction of movement of the money item conveyor.

4. The money item conveyor according to claim 1, wherein the two parts of the second support surface are separated by a step.

5. The money item conveyor according to claim 1, wherein the conveying members each comprise a money item boundary surface which is upstanding from the second support surface.

6. The money item conveyor according to claim 1, wherein the conveying members each comprise a money item conveying surface which is upstanding from the first support surface.

7. The money item conveyor according to claim 1, wherein the articulation region of each of the plurality of money item conveying members comprises an articulation line which extends across the conveying member in a direction which is substantially perpendicular to a direction of movement of the money item conveyor.

8. The money item conveyor according to claim 1, wherein the articulation region of each of the plurality of money item conveying members comprises a hinge.

9. The money item conveyor according to claim 1, wherein the plurality of money item conveying members is configured to receive money items from a money item hopper.

10. The money item conveyor according to claim 1, wherein a lower part of the two parts of the second support surface is further from the articulation region than a higher part of the two parts.

11. The money item conveyor according to claim 10, wherein the first support surface is coplanar with the higher part of the two parts of the second support surface when the higher part of the two parts of the second support surface is parallel with the first support surface.

12. The money item conveyor according to claim 1, wherein the first and second money item support surfaces of each of the plurality of money item conveying members are provided on first and second sections of the money item conveying member.

13. The money item conveyor according to claim 12, wherein the first and second sections of each of the plurality of money item conveying members includes a length that is equal to or less than 35 mm.

14. The money item conveyor according to claim 12, wherein the first and second sections of each of the plurality of money item conveying members includes a length or width that is equal to or less than 33 mm.

15. The money item conveyor according to claim 12, wherein a width of the first and second sections of each of the plurality of money item conveying members is equal to or less than 31 mm.

16. The money item conveyor according to claim 12, wherein the first and second sections of each of the plurality of money item conveying members includes a length that is equal to or less than 40 millimeters (mm).

17. The money item conveyor according to claim 16, wherein the length of the first and second sections is approximately parallel to a direction of movement of the money item conveyor.

18. A money item dispensing system, comprising:
a money item hopper;
a money item handling apparatus operable to receive money items from the money item hopper the money item handling apparatus comprising:
a money item conveyor, the money item conveyor including a plurality of money item conveying members configured to convey money items around a looped path, each of the plurality of conveying members comprising first and second money item support surfaces configured to simultaneously support a main face of a money item on a conveying member, the first and second money item support surfaces being separated by an articulation region to allow relative movement of the first and second money item support surfaces, wherein the second support surface comprises two parts that are non-coplanar.

19. The money item dispensing system according to claim 18, comprising an additional money item conveyor.

20. The money item dispensing system according to claim 19, wherein the additional money item conveyor comprises an endless loop conveyor and the money item handling apparatus is located within an internal region of the additional conveyor.

* * * * *